UNITED STATES PATENT OFFICE.

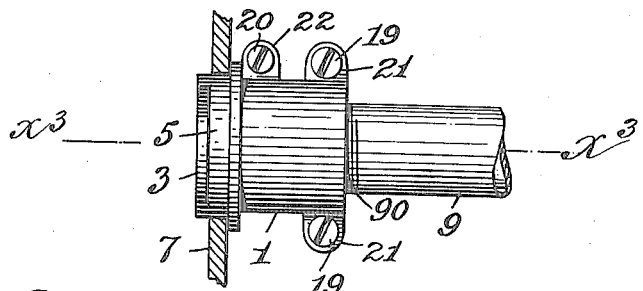
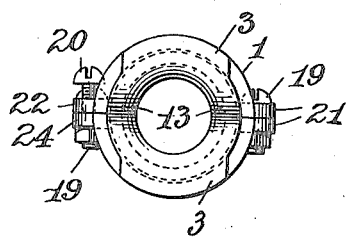
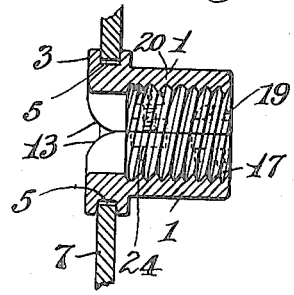
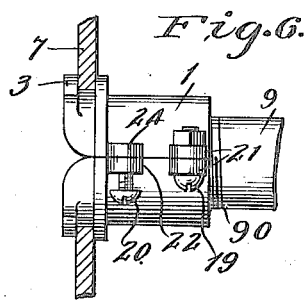
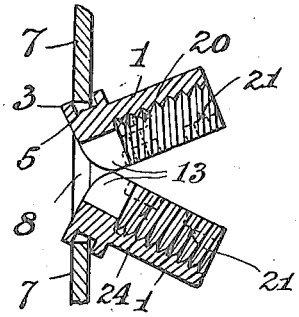
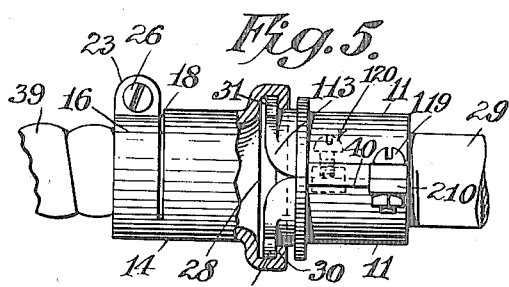

ADNAH McMURTRIE, OF NEW YORK, N. Y., ASSIGNOR TO THOMAS & BETTS COMPANY, OF NEW YORK, N. Y., A CORPORATION OF NEW YORK.

PIPE-COUPLING.

1,207,959.  Specification of Letters Patent.  Patented Dec. 12, 1916.

Application filed April 1, 1915. Serial No. 18,599.

*To all whom it may concern:*

Be it known that I, ADNAH McMURTRIE, of New York, N. Y., have invented certain Improvements in Pipe-Couplings, of which the following is a specification, like characters on the drawings designating like parts.

This invention relates to pipe-couplings, and is of particular utility when embodied in the construction of a "union" or similar member having for its function the coupling of a pipe to another article in such a manner as to permit rotation of one relatively to the other while holding the coupled members against relative axial displacement, my invention being likewise applicable in any field for use in which it is adapted by the nature of my improvements.

As an example of one use to which such a union can be advantageously applied, I may cite the attachment of the end of a pipe or sheath for electrical conductors to an outlet box or similar electrical conduit member in which there exists an outlet aperture having continuous walls (*i. e.*, not a box "split" horizontally across the aperture) and my invention consists essentially in forming a tubular device split to form segments which can be tilted for introduction within the aperture at a portion thereof of sufficient diameter to admit the retaining portion, and in so constructing the device that the segments can then be tilted to position the retaining portions for engagement with the aperture walls, the device being also brought into retentive engagement with the walls of the pipe to be secured to said box.

I may form my improved attachment of any suitable material and by any suitable method, as for example by casting a plurality of semi-cylindrical segments having retaining flanges with grooved peripheries constructed to be assembled with their flanges presented in opposite directions but first tilted toward each other to reduce their combined diameter and permit their introduction within a hole of less breadth than that of the extremities of the retaining flanges when their segments are assembled in cylindrical arrangement upon the end of a pipe and the flanges tilted back into radial position. When thus in place, the peripheral groove receives the wall of the outlet box and the flanges prevent displacement of the flanged head axially relatively to the outlet box wall, but the groove is deep and wide enough preferably to permit free rotation of the union and its connected pipe relatively to the box, or of the box relatively to the pipe. Preferably, these segments are cast with rounded shoulders symmetrically arranged to furnish respectively a rounded fulcrum so that opposed segments may be tilted with these rounded shoulders in contact with each other, and preferably they are furnished with securing means, such as bolts and nuts, to hold them in assembled cylindrical relation, clamped upon the pipe end, and with their retaining flanges in place for engagement with the hole-walls.

Another important object of my invention is to provide such a union for two sections of pipe, one of the coupling members of this union comprising the tilting segments already described, while the coöperating coupling member has an inwardly directed mouth, flange of annular contour surrounding a central aperture into which the tilted flanges on the segmental member may be introduced, and there locked by compressing the segmental body portions upon the pipe end, to which they are secured by bolts or other appropriate means.

I prefer to provide the union segments with interior screw threads to permit rotative coöperation with the threaded end of the pipe upon which they are seated, and also with means acting to force the flanged portions apart radially into contact with the walls of the aperture in the box or of the coöperating union member of any sort with which they may be coupled, so that after completion of the rotative adjustment, during which the union segments have been free to rotate, they can then be set in adjusted rotative and axial relation to the pipe and box or other conduit member, the contact thus effected serving to accomplish the electrical connection so often requisite to prevent destructive electrical effects where metallic conduit systems form part of electrical circuits either by design or accident.

The various features of my invention will be illustrated and described fully in the accompanying drawings and specification and pointed out in the claims.

In the drawings, Figure 1 illustrates in plan view a connector for electrical outlet boxes, in the construction of which my invention has been embodied, and which is shown in place connecting a conduit to an apertured wall of an outlet box; and Fig. 2 is a view of the same in front elevation; while Fig. 3 is a vertical, sectional view thereof taken on the line $x^3$—$x^3$ of Fig. 1; and Fig. 4 is a view similar to Fig. 3, but showing the segments tilted, ready for emplacement; Fig. 5 being a view similar to Fig. 1, but showing the coupling member of Fig. 1 in place as part of a union between two conduit pipes. Fig. 6 is a view looking from the top of Fig. 1.

In the embodiment of my invention selected for illustration and description to permit ready and complete understanding of my improvements, each of the parts designated by the reference numerals 1 is a segment of the body portion of my device, made of any suitable material, such as of metal cast in semi-cylindrical contour and provided with retaining flanges 3, grooved as at 5 to receive the walls 7 of the aperture in an outlet box to which the connector is utilized to secure the electrical conductor sheath or pipe 9. In accordance with an important feature of my invention, these segmental members have their retaining flanges 3 formed of less than a complete semi-circle, and their mouths shaped to form lips or fulcra 13, to facilitate the turning of the segments on each other into the position shown in Fig. 4 for insertion within the aperture 8 of the outlet box. These apertures are of standard diameter usually, and I prefer to form the segments of such diameter that when assembled in cylindrical arrangement and secured firmly with their body portions 17 in close contact with the pipe 9, the flanges 3 will be expanded and presented radially in position to prevent axial displacement relatively to the walls 7 of the outlet box, but will be maintained at a suitable position radially to permit free relative rotation of the pipe 9 and walls 7, as usual in unions of this character, the groove 5 being also of appropriate dimensions to facilitate such relative rotation, for purposes of adjustment.

Any suitable means may be provided to secure the union members 1 together in this assembled position, and as one convenient form of means for this purpose I have shown retaining bolts 19 passing through the apertured lugs 21 of the segment bodies 17, the proportions of the parts being preferably such that when the bolts 19 are tightened the body portions 17 will be clamped upon conduit 9 with substantially no clearance along the line of juncture, but with sufficient clearance in the groove 5 to leave the walls 7 free rotatively, as already described.

In Fig. 5 I have shown a union similar in essential respects to that illustrated and described with reference to Figs. 1 to 4, but slightly modified for adaptation to unite two tubular conduit members 29 and 39 upon one of which the coupling part has its body portion 14 seated, and secured by a "squeeze" connection comprising flexible tongues 16 formed by forming a kerf 18 in the material to divide from the body these strap-like tongues, and forming the free ends of the tongues into lugs 23, with fastening bolt 26, by which the member 14 may be fastened upon the pipe 39. The segments 11 have flanges 31, as already described with reference to Figs. 1 to 4, and these segments can be tilted about rounded shoulders 113 to collapse the flanges 31 into a position like that shown in Fig. 4 for insertion into the mouth 28 of the coupling member 14. This mouth may be of any suitable material and form, and as one convenient form is shown as having a mouth-flange 30 with a round central aperture, which mouth-flange may be considered, and will be herein claimed, as the substantial equivalent of the aperture walls 7 already described in that part of the specification relating to the coupling of the conduit 9 to the box walls 7 by the union member 1, for in operation of the union members 11 their flanges 31 will be tilted into the position illustrated in Fig. 4, and will then be inserted in the central mouth aperture of coupling member 14 and the segment bodies 11 will be contracted upon the conduit 29 and there fastened by bolts 119, passing through lugs 210, with the result that the flanges 31 will be presented in expanded position radially within the mouth of the coupling member 14, to the rear of the mouth flange 30, and will be thereby held, completing the union of members 11 and 14 in coupled relation, with the conduit members 29 and 39 held against relative axial displacement.

I have shown at 20 in Figs. 1 and 2 and 6 a set-screw passing through a threaded hole in the lug 22 and bearing against an opposed lug 24 upon the other segment, the purpose of this set-screw being to afford one convenient form of construction to force the flanges 3 against the walls 7 of the aperture 8 when the rotative adjustment has been completed by turning the interiorly threaded portion 17 of the segments upon the threaded end 90 of the pipe. A very slight expansion by this means would ordinarily serve to adjust the segments into retentive position of their flanges 3 with relation to walls 7, and then by tightening the bolts 19 the connector would be maintained in adjusted position, fixed upon pipe 9, held against axial displacement within the aperature walls 7 and free to rotate therein, or fixed against such rotation, according to the extent to which the screw 20 is set up.

At 40 in Fig. 5 I have shown a flange extending over the joint between the segments 11, in order to seal any opening caused by their slight separation under the action of the set screw 120, the latter being similar in structure and function to the set-screw 20 above described.

Having illustrated and described my invention thus fully and suitable means by which the same may be carried into effect, I wish it to be understood that I do not limit myself to the specific materials and structural forms selected for illustration and description, nor in general do I limit myself otherwise than as set forth in the claims read in connection with this specification.

What I claim as new and desire to secure by Letters Patent is:

1. A pipe-coupling, comprising a plurality of opposed segments forming when assembled a tubular device, said segments having respectively body portions and head portions with retaining flanges, said head portions being constructed with lips adjacent to the region of juncture to permit relative tilting movement of said segments to collapse and alternately to expand said head flanges, said segments being provided with lugs and with draft members engaged with said lugs and serving to draw said segment bodies into clamping engagement with a tubular conduit member, and separate means to expand said head into retentive engagement with the apertured wall of another electrical conduit member, and thereby to set said device in connective relation with said conduit members.

2. A pipe-coupling, comprising a tubular device having attaching body and head portions, said device being split longitudinally to permit collapse of said head for application to the aperture wall of an electrial conduit member, and also to permit expansion of said body to receive a tubular electrical conduit member, and means to contract said body and thereby to position said flanges to hold said connector against axial displacement, and separate means to expand said head into binding retentive engagement and electrical contact with said aperture wall, substantially in the manner, and for the purpose, set forth.

3. A pipe-coupling, comprising a tubular device having a body and a head split longitudinally and provided with oppositely presented retaining flanges, the material of said device being constructed and arranged to form a fulcrum intermediate said body and head, to permit tilting movements of the portions on each side of said split, for alternate expansion and contraction of the body and head to permit application of said device to the apertured wall of an electrical conduit member and to a tubular conduit member, and its subsequent retentive engagement therewith by expansion of said head and contraction of said body, means to hold said segments in contracted assembled position, and separate means to spread said flanges into binding engagement with said aperture wall.

4. A pipe-coupling, comprising a plurality of opposed segments forming when assembled a tubular device, said segments having respectively body portions and head portions with retaining flanges, said head portions being constructed with lips adjacent to the region of juncture to permit relative tilting movements of said segments to collapse and alternately to expand said head flanges, means to hold said segments in contracted assembled position, and separate means to spread said flanged portions apart.

Signed at New York in the county and State of New York this 9th day of March, 1915.

ADNAH McMURTRIE.

Witnesses:
ALEXANDER C. PROUDFIT,
RANDOLPH P. HARRISON.